C. G. FULMER.
TESTING DEVICE.
APPLICATION FILED SEPT. 18, 1911.
1,027,834.
Patented May 28, 1912.
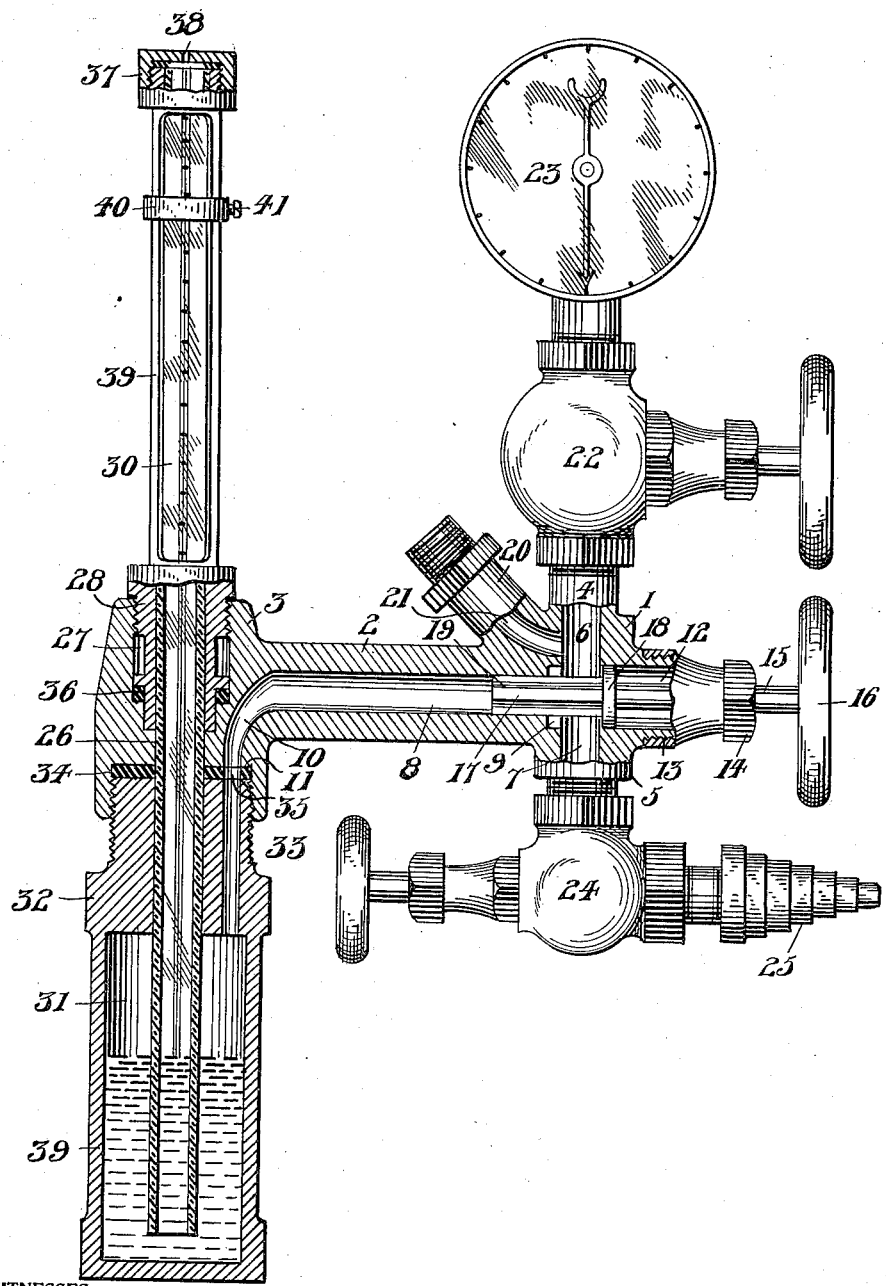
WITNESSES
INVENTOR
Charles G. Fulmer
BY
ATTORNEYS

UNITED STATES PATENT OFFICE.

CHARLES G. FULMER, OF McKEESPORT, PENNSYLVANIA.

TESTING DEVICE.

1,027,834.

Specification of Letters Patent. Patented May 28, 1912.

Application filed September 18, 1911. Serial No. 649,841.

*To all whom it may concern:*

Be it known that I, CHARLES G. FULMER, a citizen of the United States of America, residing at McKeesport, in the county of Allegheny and State of Pennsylvania, have invented certain new and useful Improvements in Testing Devices, of which the following is a specification, reference being had therein to the accompanying drawing.
This invention relates to a testing device for ascertaining leaks in gas, water and other supply pipes, and the primary object of my invention is to combine mercury and gage tests, whereby the accuracy of a mercury test can be readily determined by a gage test.

A further object of my invention is to provide an instrument that can be advantageously used by gas inspectors and testers for determining leaks or weak places in the service pipes or mains of a gas, steam, water or air system.

With the above and other objects in view, the invention resides in the novel construction, combination and arrangement of parts to be hereinafter specifically described and then claimed.

Reference will now be had to the drawing, wherein there is illustrated a front elevation of the testing device that is partly broken away and partly in section.

A device in accordance with this invention comprises a valve body 1 having a longitudinal extension 2 terminating in a head
3. The valve body 1 has vertical connections 4 and 5, said connections having alining ports 6 and 7 respectively in communication with a longitudinal port 8 provided therefor in the extension 2. The inner end of the port 8 terminates in an annular valve seat 9, and the outer end thereof is curved, as at 10 to terminate in a socket 11 formed in the lower end of the head 3. The valve body 1 has a cylindrical bore 12 alining with the longitudinal port 8, and the body 1 is reduced and exteriorly screw threaded, as at 13 to accommodate a stuffing box 14. Rotatably mounted in the stuffing box 14 is a valve stem 15 having the outer end thereof provided with a hand wheel 16 and the inner end with a valve plug 17 and a head 18. The valve plug 17 extends into and is guided by the longitudinal port 8, and the head 18 is adapted to engage in the annular seat 9 at the end of said port. The plug 17 is longitudinally grooved or fluted, as at 19 whereby the ports 6 and 7 can communicate with the port 8 when the head 18 is unseated or the valve in an open position. Formed integral with the valve body 1 is an angularly disposed extension 20 having a port 21 formed therein communicating with the vertical port 6. The extension 20 is adapted to be connected by a union or a suitable coupling to a service line, (not shown). Connected to the vertical connection 4 is a shut-off valve 22 and connected to this valve is a conventional form of pressure gage 23. Connected to the vertical extension 5 is a pump valve 24 provided with a stepped nipple 25 to which a pump can be easily connected. The valves 22 and 24 are of the ordinary and well known type of globe valve.

The head 3 of the longitudinal extension 2 has a central opening 26 establishing communication between the socket 11 and a socket 27 in the upper end of said head. Detachably mounted in the socket 27 is the base 28 of a vertical tube casing 29, and arranged in said casing is a mercury tube 30 that extends through the base 28 and the opening 26. The lower end of the mercury tube 30 terminates in a mercury chamber 31 formed in a cylinder 32, carried by the head 3, the upper end of the cylinder being reduced and exteriorly screw threaded to enter the socket 11. The upper end of the cylinder 32 has a port 33 establishing communication between the chamber 31 and the curved end 10 of the port 8. The tube 30 extends into close proximity to the bottom of the chamber 31, and surrounding said tube, between the reduced end of the cylinder 32 and the head 3 is a resilient gasket 34, said gasket having an opening 35 registering with the ports 8 and 33. Another resilient gasket 36 is interposed between the base 28 and the bottom of the socket 27, and these gaskets are adapted to cushion the mercury tube 30 within the head 3. The tube is made of glass or transparent material and the upper end thereof is provided with a head 37 having a small port 38 to permit of air escaping from said tube when mercury 39 within the chamber rises in the tube. The tube 30 is graduated, and adjustably mounted upon the casing 29 is a band or ring 40 that can be fixed relatively to said casing by a set screw 41.

In using the device for testing purposes in connection with the service line of a gas supply, the angularly disposed extension 20 is coupled on to the service line and the stepped nipple 25 is connected to a pump. When air is pumped into the service line, the air passes into the longitudinal port 8, through the port 33 and produces a pressure upon the mercury 39 within the chamber 31. The mercury is forced upwardly in the tube 30 to indicate by the graduations upon the tube the exact excessive pressure to which the service line is subjected. Small leaks and weak places in the service line are readily detected when the pressure is increased within the service line, and when the pressure is raised to approximately twelve pounds, as would be indicated by the graduated tube 30, the band 40 is then set on a level with the mercury within the tube 30. The valve head 18 is now seated to close the longitudinal port 8, and by further operating the pump, the air will pass upwardly into the gage 23 and indicate the amount of pressure to which the service line is subjected. The gage 23 can be readily compared with the mercury tube 30, and it is in this manner any inaccuracy in the gage 23 or the mercury tube 30 can be readily detected. In other words, a tester has the satisfaction of knowing that either by the use of the mercury column or the gage that the service line has been tested a predetermined number of pounds pressure. The pressure within the service line can be maintained by closing the valve 24, and the valve 22 is closed when it is desired to remove the gage 23 either to repair or to renew the same.

What I claim is:—

1. A testing device comprising a valve body having vertical ports formed therein, an extension carried by said valve body and having a longitudinal port formed therein, a valve carried by said valve body and adapted to close the longitudinal port of said extension, an angularly disposed extension carried by said valve body and in communication with the vertical ports thereof and adapted to be connected to a service line, a head carried by the longitudinal extension of said valve body, a mercury chamber supported by said head, a tube carried by said head and extending into said chamber, a gage carried by said valve body and in communication with the vertical ports thereof, and means to facilitate supplying air to said gage and to said mercury chamber for testing the pressure in the service line connected to the angularly disposed extension of said valve body.

2. A testing device comprising a valve body having an angularly disposed extension for connection to a service line, a gage in communication with said valve body, a cut-off communicating with the valve body and having a stepped nipple for connection with a source of air supply, a tube containing a mercury column supported from said body and adapted to have mercury forced therein by a pressure of air through said body, a mercury well supported from the valve body and into which said column extends, and means whereby the gage can be used independently of said column.

3. A testing device comprising a valve body having means for connection to a service line, a gage supported from and in communication with said valve body, a cut off supported from and in communication with said valve body and capable of communicating with a source of air supply, a tube containing a mercury column supported from said body and adapted to have mercury forced therein by a pressure of air through said body, a mercury well supported from and communicating with said body and into which said column extends, and means carried by the valve body whereby said gage can be used independently of said column.

4. A testing device comprising a valve body having a longitudinally extending port and a valve seat therein, said body further provided with a transversely extending port, an inclined extension communicating with said transverse port and capable of being connected to a service line, a gage communicating with one end of said transverse port, a cut-off communicating with the other end of said port and capable of communicating with a source of air supply, a mercury well supported from said body and communicating with said longitudinal port, a tube containing a mercury column supported from said body and extending in said well, and a valve extending in said body and capable of engaging said seat whereby the gage can be used independently of the column.

5. A testing device comprising a valve body having a longitudinally extending port, a mercury well communicating with said port and supported by said body, a tube containing a mercury column supported by said body and extending in said well, a gage communicating with said port, a cut-off communicating with said port and capable of communicating with a source of air supply, means for establishing communication between said port and a service line, and means operable within said body for closing said port to the service line whereby the gage can be used independently of the column.

In testimony whereof I affix my signature in the presence of two witnesses.

CHARLES G. FULMER.

Witnesses:
 MAX H. SROLOVITZ,
 CHRISTINA T. HOOD.

Copies of this patent may be obtained for five cents each, by addressing the "Commissioner of Patents, Washington, D. C."